(12) United States Patent  (10) Patent No.: US 6,278,430 B1
Larson et al.  (45) Date of Patent: Aug. 21, 2001

(54) THERMOSENSITIVE DISPLAY DEVICE (75) Inventors: Ove Larson, Fullriggaren; Mattias Ulf Byström, Kärrvägen; Lars Grösta Henrik Fries, Åvägen; Jens Göran Lindö, Källedasvägen, all of (SE)

(73) Assignee: Array Printers AB, Vastra Frolunda (SE)

( * ) Notice: Subject to any disclaimer, the term of this patent is extended or adjusted under 35 U.S.C. 154(b) by 0 days.

(21) Appl. No.: 09/036,228

(22) Filed: Mar. 6, 1998

(51) Int. Cl.$^7$ ........................................................ G09G 3/34
(52) U.S. Cl. .......................... 345/106; 345/214; 349/21; 349/161; 347/206
(58) Field of Search .................................. 345/106, 214; 347/194, 179, 171, 172, 206; 349/21, 161

(56) References Cited

U.S. PATENT DOCUMENTS

| | | |
|---|---|---|
| 3,354,565 | 11/1967 | Emmons et al. . |
| 3,410,399 | 11/1968 | Hunter . |
| 3,637,291 | 1/1972 | Kesler et al. . |
| 3,725,898 * | 4/1973 | Canton .................................. 347/194 |
| 3,831,165 * | 8/1974 | Chivian et al. ...................... 345/214 |
| 3,877,008 * | 4/1975 | Payne .................................... 345/106 |
| 3,897,643 | 8/1975 | Morris, Jr. et al. . |
| 4,277,145 | 7/1981 | Hareng et al. . |
| 4,442,429 * | 4/1984 | Kotani et al. ......................... 345/106 |
| 4,501,503 | 2/1985 | Buirley et al. . |
| 4,514,045 | 4/1985 | Huffman et al. . |
| 4,525,708 | 6/1985 | Hareng et al. . |
| 4,598,978 | 7/1986 | Mourey et al. . |
| 4,641,924 | 2/1987 | Nagae et al. . |
| 4,673,256 | 6/1987 | Hehlen et al. . |
| 4,682,605 | 7/1987 | Hoffman . |
| 4,837,071 | 6/1989 | Tagoku et al. . |
| 4,922,242 | 5/1990 | Parker . |
| 4,995,705 | 2/1991 | Yoshinaga et al. . |
| 5,040,879 | 8/1991 | Haven . |
| 5,128,662 | 7/1992 | Failla . |
| 5,140,448 | 8/1992 | Bone et al. . |
| 5,144,464 | 9/1992 | Ohnishi et al. . |
| 5,202,677 | 4/1993 | Parker et al. . |
| 5,296,952 | 3/1994 | Takatsu et al. . |
| 5,343,318 | 8/1994 | Basturk . |
| 5,486,941 | 1/1996 | Saivchi et al. . |
| 5,548,420 | 8/1996 | Koshimizu et al. . |
| 5,620,781 | 4/1997 | Akashi et al. . |
| 5,786,838 * | 7/1998 | Steinhauser et al. ................ 347/179 |

FOREIGN PATENT DOCUMENTS

| | | |
|---|---|---|
| 2349234 | 12/1972 | (DE) . |
| 1330420 | 9/1973 | (GB) . |
| 1453984 | 10/1976 | (GB) . |
| 6329795 | 5/1990 | (JP) . |
| 357879 | 6/1973 | (SE) . |
| 396826 | 10/1997 | (SE) . |
| WO9201565 | 2/1992 | (WO) . |
| WO9426528 | 11/1994 | (WO) . |

* cited by examiner

*Primary Examiner*—Steven Saras
*Assistant Examiner*—Fritz Alphonse
(74) *Attorney, Agent, or Firm*—Knobbe, Martens, Olson & Bear, LLP (57) ABSTRACT

A thermosensitive display device including a thermosensitive material applied in a thin layer, and an array of resistors arranged on a thin flexible film. Each one of said resistors has a thin planar configuration and extends in the plane of said flexible film and essentially covers a square-shaped area. The resistors are arranged to emit host energy all over said square-shaped area when fed with electricity. The thin layer with thermosensitive material is applied directly in thermal contact with the thin flexible film. The device further including means for controlling the temperature in each of said areas.

35 Claims, 9 Drawing Sheets

THERMOSENSITIVE DISPLAY DEVICE

BACKGROUND OF THE INVENTION

This invention relates to an electrically controlled display device for generating heat in a selected patern in order to display information.

Several different technologies are used today to present information. These can be grouped in two major categories electronic and mechanical. Older mechanical displays are still in use today in many places. They are however slow since each message needs to be flipped up to the display surface and they are also inflexible as only a fixed and predetermined set of information can be displayed. Since they are mechanical and have numerous moving parts, they are also expensive to manufacture and to maintain.

Modern versions of these mechanical display exist. These modern versions have a large amount of pixels which can be arbitrarily rotated to show either the front side or the back side. Information is then displayed by addressing the desired pixels and flipping them. The drawbacks with this modern display are that they still contain a lot of moveable parts and that they are slow.

Public information displays based on arrays of light emitting diodes are common today. The display consists of a large amount of light emitting diodes which can be individually controlled to display information. Displays based on red or yellow light emitting diodes are common in many situations, and full colour displays in very large formats are used in sport stadions and the like. In a full color display, each pixel consists of at least three different diodes (red, green and blue). These displays can be made very large and are capable of displaying full motion video.

Displays using light emitting diodes to show information have excellent contrast and readability when ambient light is low or non existent. However they have very poor readability in sunlight and the information is only visible in a very narrow viewing angle.

Displays using liquid crystals to show information are suitable for protected enviroments but are not generally used outdoors due to their relatively low level of brightness, low contrast in bright sunlight and need for protection from the elements. Many liquid crystal displays have been prepared by applying a liquid crystal material onto a conductive electrode element, such as those described in U.S. Pat. Nos. 3,578,844 and 3,600,060. Such electrodes are used to generate an electric field across the liquid crystal layer and require complex electroding arrangements.

An another type of display is that which uses a reversible thermochromic material, i.e. one that changes color upon exposure to a temperature above a transition point. U.S. Pat. No. 3,354,565 describes the use of such a material to produce a passive information display. A metal iodide or metal bromide thermochromic material is desposited over an array of thin resistors positioned on an alumina substrate. The resistors are formed of barium titanate, a material exhibiting a positive temperature coefficient of resistance (PTC behavior). They are connected by suitable electrodes so that when power is applied to selected elements, specific resistors heat up above the transition point of the thermochromic material, causing it to change color and display information. The PTC effect prevents the resistors from overheating and damaging the display.

Displays comprising ceramic resistors such as barium titanate are subject to a number of problems. Such resistors are brittle and difficult to form or machine into intricate shapes or large sizes. They may be subject to cracking under high electrical or thermal stresses, particularly when exposed to overcurrent conditions. The resistors are difficult to manufacture into very thin elements, limiting the rate of thermal transfer to the thermochromic material. There is generally a mismatch in thermal coeffients of expansion between the ceramic and the thermochromic, which can result in cracking or delamination of the thermochromic from the ceramic resistor in use.

The international patent application WO 94/26528 discloses a display for the visualization of still or moving images where temperature changes are produced in a pattern of resistive elements and transformed to visible dots in a visualization medium. The display consists of a matrix having at least two sets of electrodes which sets cross each other and are distanced from each other by means of at least one resistive and/or inductive spacer means. The electrodes are arranged in rows and columns. The matrix if further connected to at least one control device for multiplexing, scanning or pulsating the control signals. The electrodes are individually addressable according to the electric signals from the control unit and arranged so that, when the selected electrodes in both sets of electrodes are energized, a temperature change is obtained at the cross point of the charged electrodes. This temperature change is conducted towards the display medium, which comprises a thermosensitive indication means, such as a layer, a body or the like. The surface of the display then transforms the temperature change to visible dots or the like.

SUMMARY OF THE INVENTION

The object of the present invention is to provide a new and improved display device which comprises the following advantages:

extremely good contrast extremely good readability under a wide viewing angle easy to maintain quick change of the displayed information low energy consumption To achieve these objects a display according to the invention includes a thermosensitive material applied in thin layer, which material changes its optical appearence from a first state to at least a second state or vice versa depending upon its temperature, and array of resistors arranged on a thin flexible film in columns and rows with each column comprising one resistor from each row and each row comprising one resistor from each column, each one of said resistors has a thin plannar configuration and extending in the plane of said flexible film and essentially cover a square shaped area defined by the overlapping parts of a row and a column, said resistors are arranged to emit heat energy all over said square shaped area when fed with electricity, said thin layer with thermosensitive material is applied directly in thermal contact with the thin flexible film and covers said rows and columns, said device further comprising means for controlling the temperature in each of said areas.

In a prefered embodiment the display device in a modular system includes one or several interconnected modules.

The above and other objects, features, and advantages will became more apparent from the following despriction when read in conjuction with the accompanying drawings in which prefered embodiments of the present invention are shown by way of illustrative examples.

Figure 1:
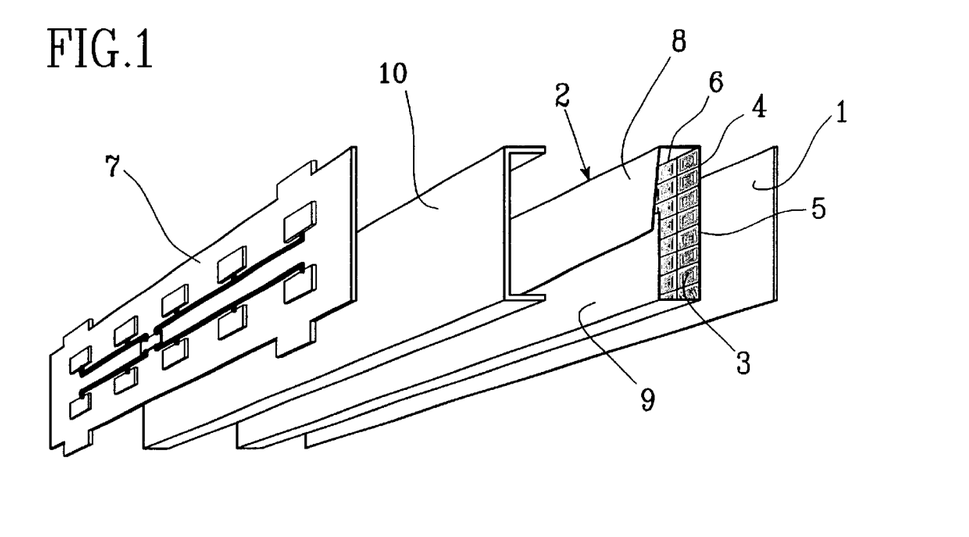
FIG. 1 is a perspective view of a first embodiment of a display device according to the invention.

The display device in FIG. 1 comprises a thermosensitive layer 1. In a prefered embodiment this layer comprises a reversible thermochromic material applied in a thin layer on a plastic film.

Thermochromic materials are characterized by that they change their optical appearance at different temperatures. Many materials exhibit some kind of thermochromic effect. One such household material is paraffin which when in the form of a candle is opaque but turns transparent when it melts. Thermochromic materials can be manufactured in many different variations allowing a choice of color, switching temperature and hysteres. The hysteres refers to the temperature range that a thermochromic material needs to change from one color to another.

A suitable thermosensitive material is the reversible thermochromic material sold under the name THERMOCLEAR by Thermographic Measuremens Co. Ltd.

A thin, flexible plastic film 2 is provided with tiny electrical heating elements, resistors 3, arranged in an array on one side of the plastic film and in a region 4 abutting directly against the thermosensitive layer 1. The resistors which, will be described in detail below, are arranged in rows 5 and columns 6 on the plastic film. Each column comprising one resistor from each row and each row comprising one resistor from each column.

Each resistor 3 is connected to drive circuits on a printed circuit card 7 and each resistor is individually controlled in order to transfer heat to a selected spot on the thermosensitive layer 1 for generating heat in a selected pattern in correspondence with the information or picture to be shown.

The film 1 with the thermochromic material is selectively heated and cooled in order to create an image. In a monochrome display, only one type of thermochromic pigment is used. There are two approaches to create a color display. Either red, green and blue pigments can be used in each pixel, or one pigment that exhibits a different color at different temperatures can be used.

The flexible film 2 have side regions 8, 9 outside the region 4. A channel-shaped element 10 of a hard material, such as plastic or aluminium, serves as support for the different parts of the assembly shown i FIG. 1. The flexible film 2 is folded around the channel-shaped support 10 and the two side regions 8, 9 are interconnected partly overlaying each other on the outside of the channel bottom of the support 10. The plastic film carrying the thermochromic material has an adhesive layer on the backside. An advantage of applying the thermochromic material on a separate film is that this film can be changed when the thermochromic layer is worn out or when one want to change the color of the film.

The colour of the above mentioned plastic film could be white.

The white color increase the contrast when the thermochromic material changes from a dark color, such as blue or black, to a milky white color when the thermochromic material is heated to its transition temperature. In the assembly according to FIG. 1 the printed circuit card contains electrical connection pins (not showed) which is pressed against circuits connection on the flexible film to establish electrical connections between the printed circuit card and the array of resistors 3.

The device in accordance with FIG. 1 is easy to maintain. The flexible plastic film 2 with the resistors 3 can, when worn out, easily be exchanged for a new one. The printed circuit card with its relatively expensive electronic components can be reused together with a new flexible plastic film 2.

The flexible plastic film 2 is inelastic. With the term inelastic is meant that the film does not stretch under normal use condition, i.e. when it is applied around the channel shaped support 10 or when the plastic film with the thermochromic layer is unfastened. As will be explained below the resistors applied on the plastic film comprise of very thin conduits which will be destroyed if the plastic film 2 is stretched.

The plastic film 1 with the thermochromic layer is fastened against the flexible film 2 with an adhesive. It is necessary that the flexible film does not stretch when plastic film is removed. Suitable plastic film for the inelastic flexible film 2 is polyimide or polyester.

Figure 2:
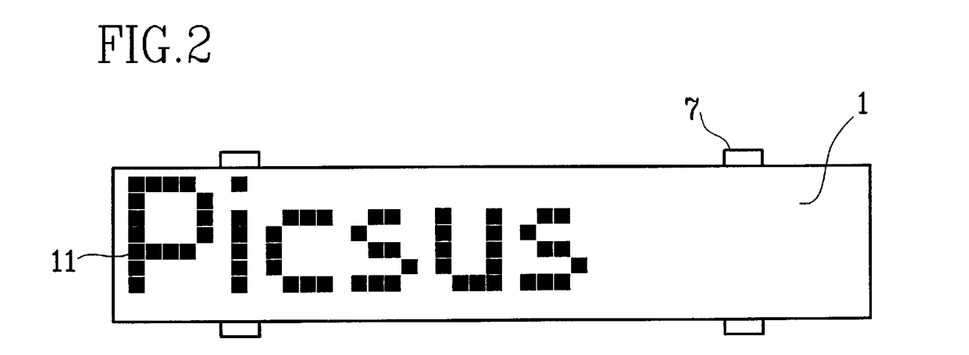
FIG. 2 is a plan view of the assembled device, according to FIG. 1 showing the display surface.

FIG. 2 shows the above described display device assembled. The display surface illustrates the principle of creating letters on the thermochromic layer. The letter P is build up of a number of square-shaped areas 11. Only the areas which are heated by the underlying resistors to the transition temperature of the thermochromic material change their optical state. The display device according to FIG. 2 can be used as a complete unit to display information. The device according to FIG. 2 can according to one aspect of the invention be a module which can cooperate with an arbitrary number of modules arranged in rows and columns to form display devices of different sizes.

Figure 3:
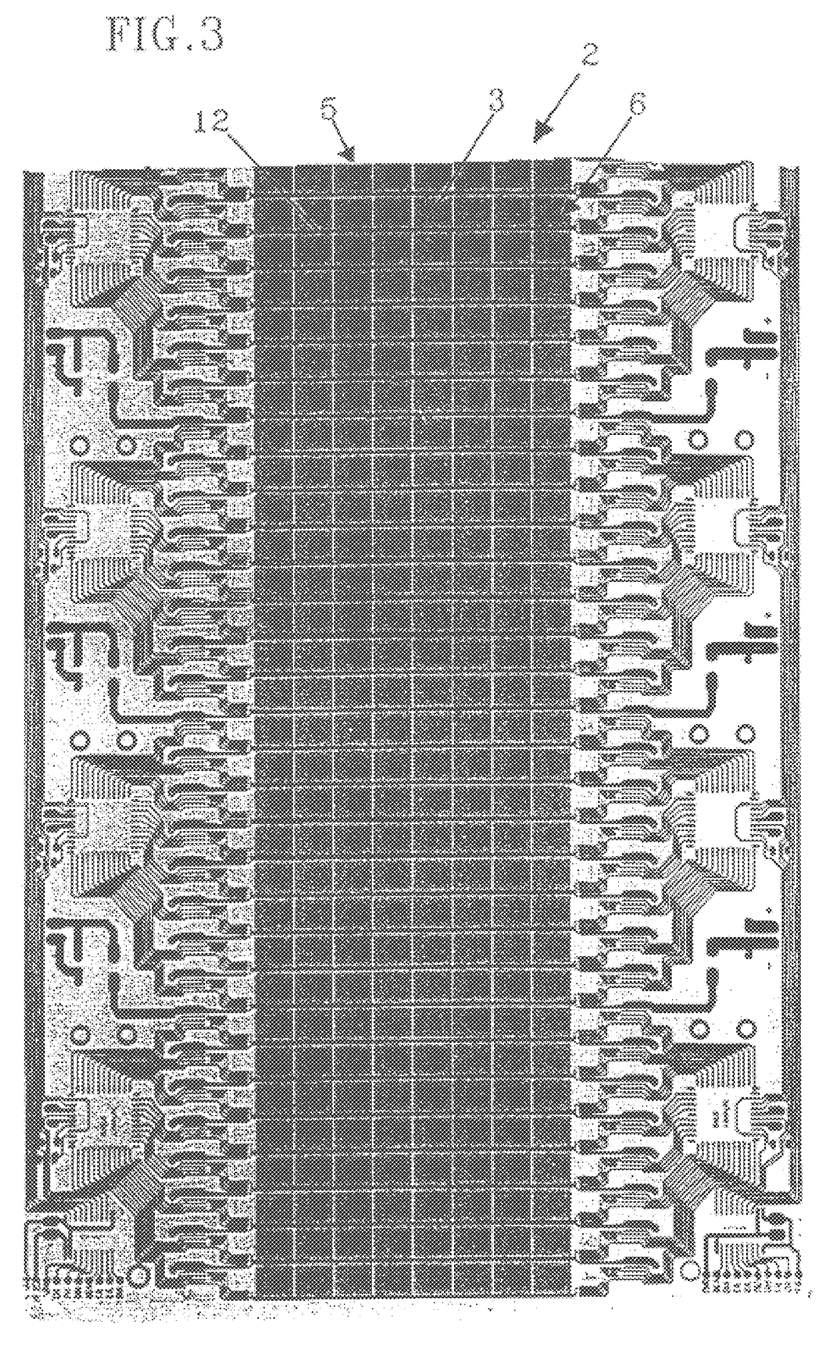
FIG. 3 is a plan view showing the heat emitting resistors and the electrical circuits in a second embodiment of the display device according to the invention.

FIG. 3 shows a flexible film 2. It comprises a plastic film, preferably of polyimide or polyester. The film has a thickness in the order of 25–50 $\mu$m and on the film is applied a layer or copper, with a thickness of 5–200 $\mu$m. In the thin copper layer on the plastic film each individual resistor 3 is etched. The resistors are arranged in the region 4 in rows 5 and column 6. In the embodiment according to FIG. 3 the flexible film 2 also serves as printed circuit card. The drive circuits are etched in the copper layer applied in the side regions 8 and 9 of the flexible film. The benefit with this is that a separate printed circuit card is eliminated.

Copper has been used in the embodiment shown in FIG. 3. Other metals or alloys can of course also be used. One advantage with copper is that the material is inexpensive. Another advantage is that the method of etching in copper is well-known.

The resistance of copper is however very low and this is a drawback when making the resistors.

Other metals or alloys with higher resistance than copper are therefore suitable.

Stainless steel with 40 timer higher resistance than copper is a suitable material for the resistors.

One other material for the tiny resistors is an alloy of nickel (Ni), ferro (Fe), and chrome (Cr) such as K70 or K52 from the firm KANTHAL Corporation.

The criterias for a suitable metal or alloy are that they should be etchable and that they should have a measurable coefficient of temperature.

Each row and columns of resistors are separated a short distance. Conduits for feeding current to the resistors are arranged in the narrow areas 12 between adjacent columns.

Figure 4:
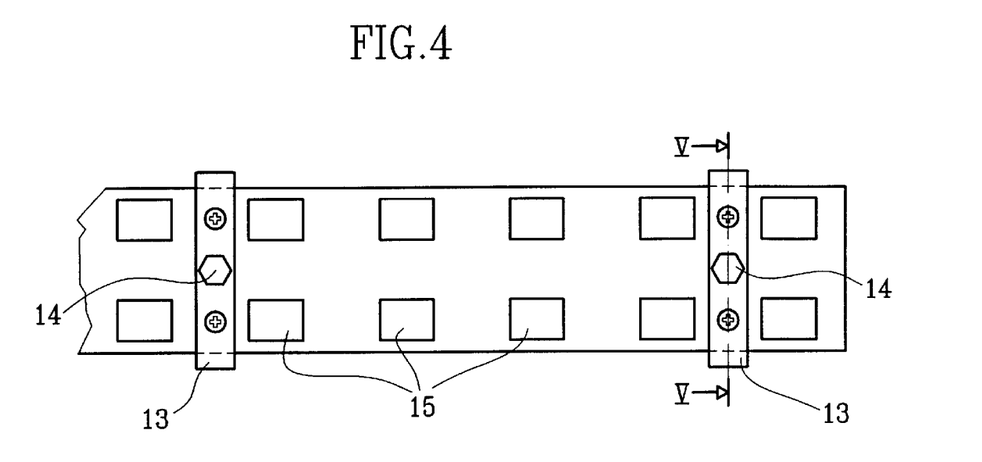
FIG. 4 shows in a plan view from behind the assembled display device in said second embodiment of the invention.
Figure 5:
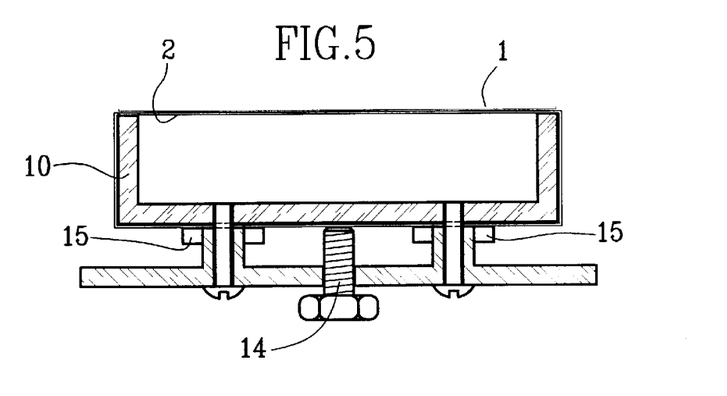
FIG. 5 is a cross-section along the lines V—V in FIG. 4.

The flexible printed circuit card as described in FIG. 3 is arranged around a channel-shaped support profile 10 in the same way as has been described above in connection with FIG. 1. The arrangement is shown in FIGS. 4 and 5. The display device comprises the flexible circuit card 2, the channel shaped support profile 10 and a thermochromic layer 1 adhered to the region 4. Cross-bars 13 are arranged under the bottom of the channel-formed profile and fastened to it. A tightening screw 14 is fastened to each cross-bar for tightening the flexible film 2 around the channel-formed profile 10.

Electrical components 15 are arranged on the drive circuits on the backside of the display device.

The flexible film 2 is arranged with the array of resistors and the layer of thermosensitive material arranged over the open side of the channel-formed profile and forming a display surface.

In a display device according to the invention in which a thermosensitive layer, such as a thermochromic layer, is used it is of vital importance that the mass of the thermochromic layer and the heating resistors is low in order to achieve a display device in which the information can be changed quickly and to keep the energy consumption low. An advantage with the channel-formed support 10 and with the resistors 3 arranged over the open side of the channel is that the resistors 3 are effectively chilled by ambient air in the channel.

Figure 6:
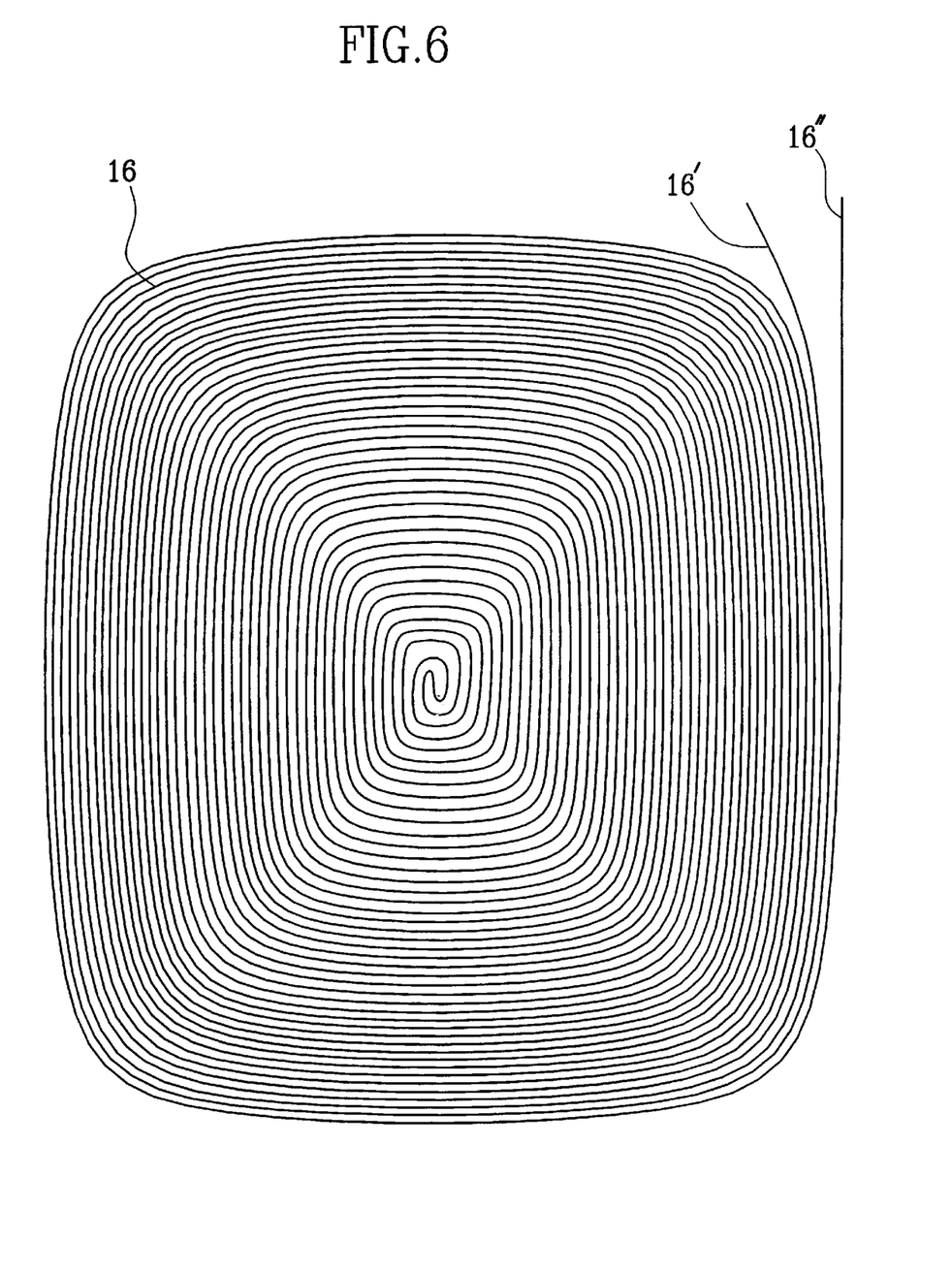
FIG. 6 shows in an enlarged scale a plan view of a first example of the heat emitting resistors in the display device according to the invention.

In FIG. 6 is shown a resistor, which, comprises a very thin conduit 16. When current flows through the very thin conduit heat is emitted which is transfered to the thermochromic layer which is arranged in direct thermal contact with the resistors. The resistor is arranged to fill up the square-shaped area formed by the overlapping areas of a row and a column in the array of resistors.

As seen in FIG. 6 one conduit is arranged in a spirale-like form in one plane. The spirale have the two ends of the conduits at its outer edge. Two parallel conduit parts 16', 16" start from said ends and run in circular like paths which for each turn is reduced in size.

In order to have good quality of the image shown on the display surface it is important that the heat transfered to the thermochromic layer in each square-shaped area (pixel) corresponds to what is intended to be shown and that the (temperature is uniform across a pixel.

If a resistor, which as mentioned above fills up the square shaped area, emit heat uniformly across said area, it will be warmer in the middle as the central part of said area will be receiving more heat from the surrounding parts of said area than the peripheral parts of said area. A further problem is that heat is transported upwards of ambient air which means that the hotest point of said power supplied surface will be displaced upwards.

The goal is to have a square shaped area with uniform temperature all over said area.

In the resistor according to FIG. 6 the distance between said parallel conduit parts and between adjacent turns in the spirale increase in direction towards the center of the spirale. In this way the flow of heat over the square-shaped area is balanced and the temperature will be the same all over said area.

Each square-shaped area is of course also effected by the temperature in the surrounding areas. This effect can however be compensated for by measuring the temperature in the actual area and in the surrounding areas and controlling the supply of energy to the different resistors to achieve the appropriate temperature in each pixel and thereby the correct image on the display device.

Figure 7:
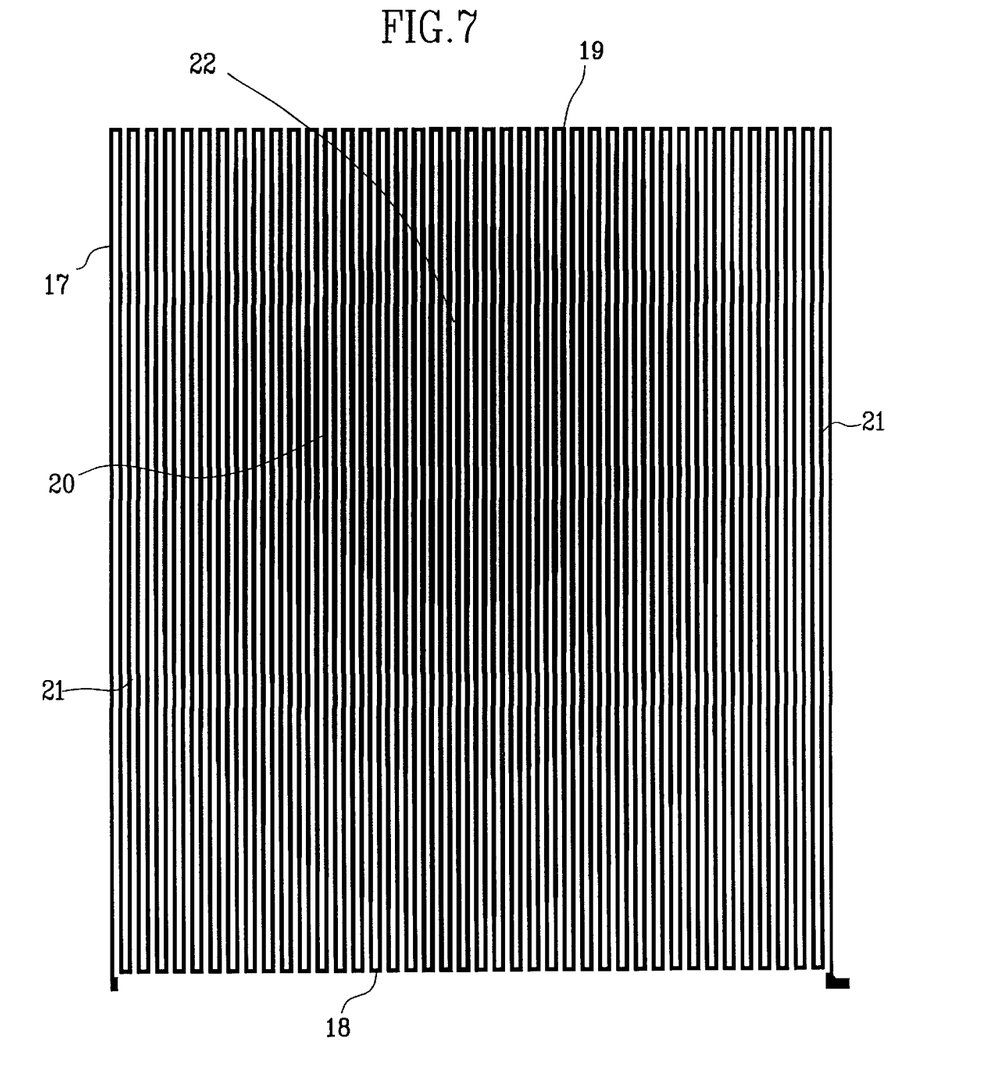
FIG. 7 shows in an enlarged scale a plan view of a second example of the heat emitting resistors in the display device according to the invention.

In the resistor according to FIG. 7 one thin conduit 17 runs from one side of the square-shaped area to the opposite side in a number of zigzag paths.

The conduit parts between the borders 18 and 19 of the square-shaped area are parallell. Temperature compensation is achieved by having wider conduit in central parts 20 compared to the borders 18, 19, 21, 21'. The conduit parts around a central point 22 are widest and the width of the conduit parts decrease stepwise towards the borders 21.

The central point 22 is displaced towards the border 19 of the square-shaped area which in use of the device is the upper border. This displacement of said central point compensate for that heat is transported upwards by ambient air.

The resistors shown in FIGS. 6 and 7 is made from a thin copper layer which is etched to form the narrow conduits.

Conduits of copper with a width of around 50–150 $\mu$m have been found to work.

Stainless steel which has a resistance which is 40 times higher than the resistance for copper is as mentioned above a suitable material for resistors of the type described in connection with FIGS. 6 and 7.

In the embodiment shown in FIG. 3 the tiny resistors 3 are arranged in rows and columns on one side of the flexible film 2. Adjacent columns of resistors in the embodiment according to FIG. 3 are separated a short distance and conduits for feeding current to the resistors are arranged in the narrow areas 12 between adjacent columns. It is of course advantageous for the quality of the image to be shown if the square-shaped areas in adjacent columns can be placed close to each other. As the conduits for feeding current to the resistors are placed between adjacent columns in the embodiment according to FIG. 3 there is a demand for conduits with very small dimensions in the interspace between adjacent columns of resistors.

Figure 8:
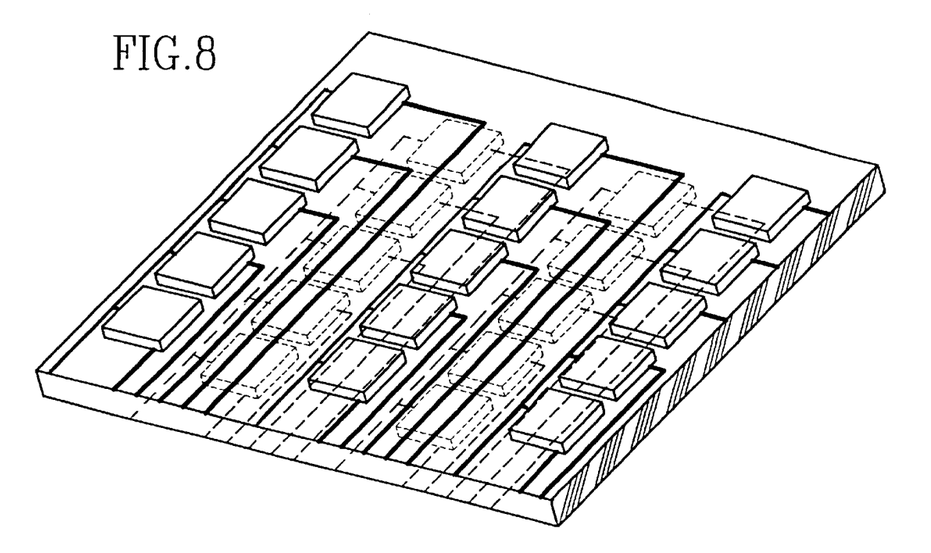
FIGS. 8–10 shows schematically different ways of arranging the resistors in rows and columns.

In the embodiment show in FIG. 8 adjacent resistors 3 in rows 5 and columns 6 are arranged on opposite sides of the flexible film 2, which arrangement gives more space for the conduits to the resistors 3.

Figure 9:
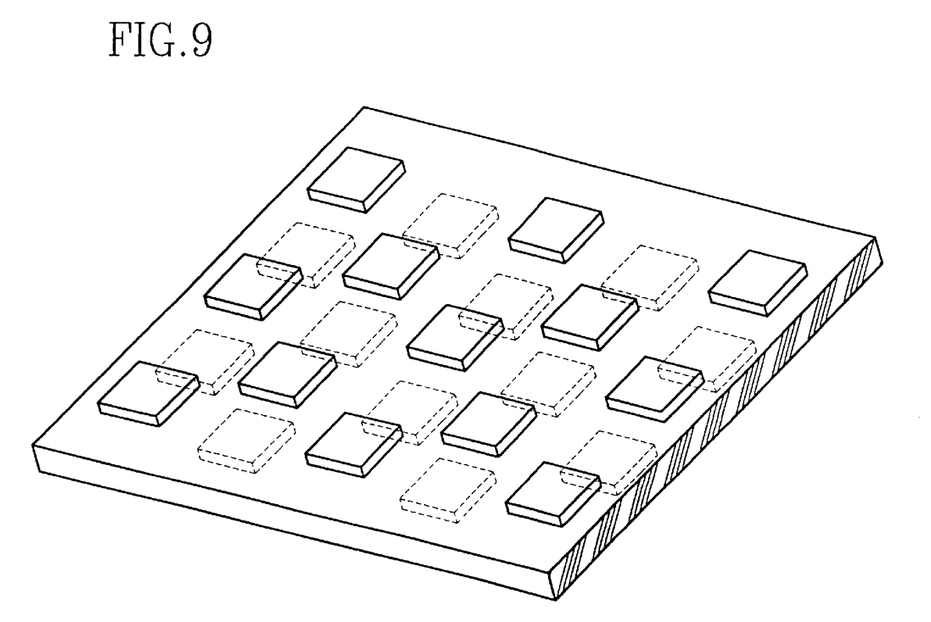

In the embodiment shown in FIG. 9 adjacent rows 5 of resistors 3 are arranged on opposite sides of the flexible film 2. Conduits 3' for supplying current to the resistors are arranged in the interspace between columns on both sides of the flexible film.

Figure 10:
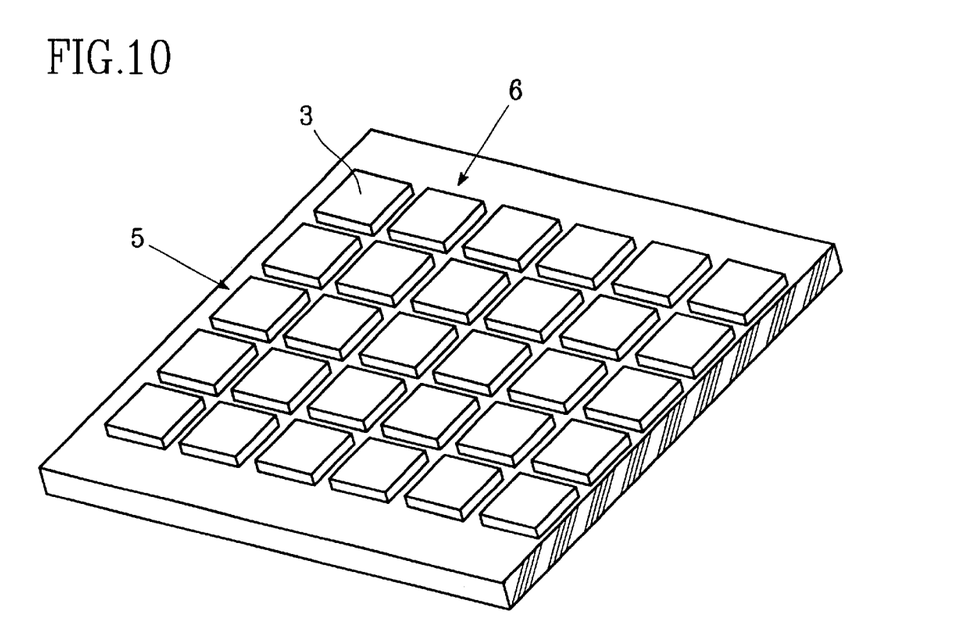

In the embodiment shown in FIG. 10 the resistors 3 are arranged in rows 5 and columns 6 on the same side of the flexible film and all conduits for supplying current to the resistors are arranged on the opposite side of the film.

In the embodiments in accordance with FIGS. 9 and 10 the resistors are arranged closed together without any space between adjacent resistors in the rows or in the columns.

With the arrangements in accordance with FIGS. 9 and 10 the material in the resistors could be chosen from materials with high resistivity, such as stainless steel while the conduits 3' for supplying current to the resistors is chosen from materials with low resistivity, such as copper.

Figure 11:
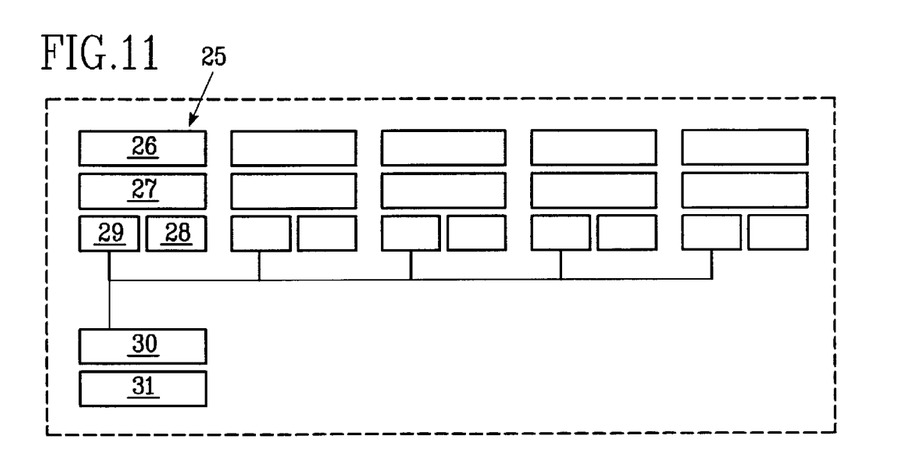
FIG. 11 is a schematic drawing showing a prefered example of a principal construction of the display device according to the invention.

FIG. 11 shows the principal construction of a display device. It includes a construction with five identical modules 25, which comprises a thermochromic layer 26, a flexible layer 27 with the resistors and drive circuits 28. Each module 25 is controlled by a microprocessor 29. The communication between the modules and the world around is managed via a software interface 30. The power supply is designated with 31.

As the resistance of a metal varies with the temperature, e.g. the resistance of copper varies 0,4% per °C., one can measure variations in the current. The temperature in each resistor is measured by feeding back to the microprocessor the variation in the current as the potential over a shunting resistance. The microprocessor then calculates the requested amount of power for the heat emitting resistor.

The resistances and thereby the temperatures are measured for all planar resistors which form the pixels of the display. When the temperature is measured in each individual resistor, it will be assured that each pixel have the correct temperature and that the image displayed is evenly heated, neither over nor under heated.

After measurement of the temperature in each pixel energy pulses are sent to the dots which are too cold. This is determined by comparing the measured resistance with a value stored in the control computers memory and the bitmap of the image to be shown. The above mentioned value refers to the switching temperature of the thermosensitive surface.

The described sequence of measurements and sending out the appropriate energy pulses is repeated while the display shows its image.

The following benefits will be realized by keeping the temperature as close as possible to the switching temperature of the thermosensitive pigment.

a) The time it takes to change from one image to another image is low. If the temperature of the dot is kept just above the switching temperature of the pigment, the number of degrees that the dot has to cool down in order to switch back its previous state is minimized, and thus the time.

b) Some thermosensitive pigments are damaged or exhibit a shorter life when they are overheated. By measuring the temperature of each dot, the computer controller can assure the the temperature never reaches a damaging temperatur. This is because it will send out less energy to a warm dot, even if the heat from the dot comes from another source such as the sun.

c) Each pixel, which is supposed to switch from one state to another, is assumed to get enough energy to switch state. The computer controller can then guarantee that all dots have fully switched and are even without having to overheat the dots.

d) The energy consumption of the display is lowered since the temperature of each dot can be kept at precisely the right temperature, which will eliminate the need to overheat the dots to guarantee that they have reached the correct temperature.

An alternative way of controlling the temperature in each pixel in accordance with the image to be shown is to measure variations in the current to the respective resistor by measuring variations in the magnetic field caused by the current.

Figure 12:
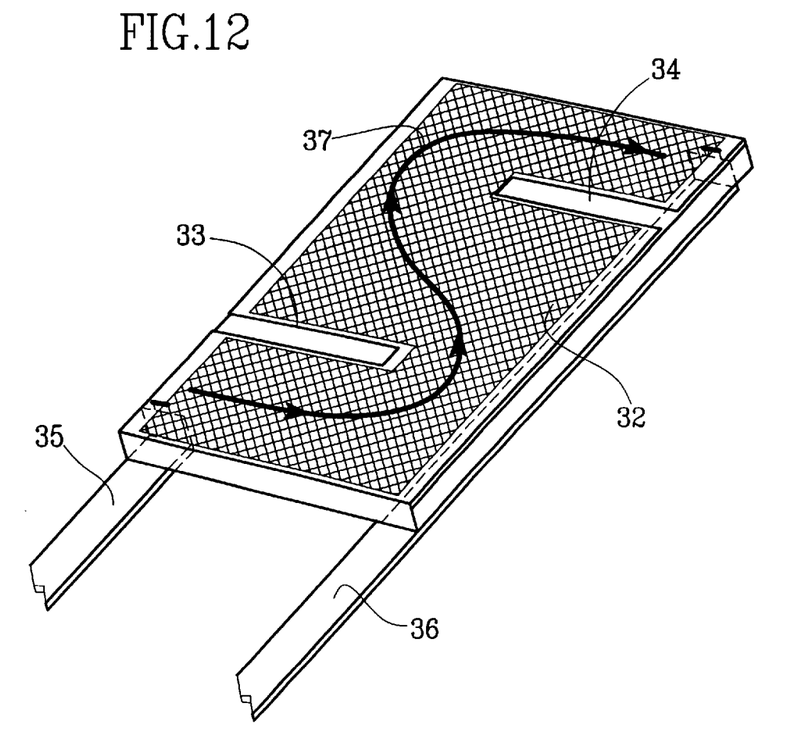
FIG. 12 shows schematically a third example of the heat emitting resistors in the display device according to the invention.

The tiny resistors serving as heat elements can be manufactured in different ways than as described above. The important thing is that an even temperature is produced over an area corresponding to a pixel on the thermosensitive display layer. The resistors can be made in a layer of coal paste arranged on the flexible film. Such an embodiment is illustrated in FIG. 12.

Coal paste is arranged on one side of the flexible film by screen printing in a pattern for forming the resistors. Conduits of copper for supplying current to the resistors are arranged on the opposite side of the flexible film. In FIG. 11 is shown one resistor, which comprises a layer of coal paste 32. The layer is interupted by the elongated areas 33, 34, which are free from coal paste and which force the current flowing from the electrod 35 to the electrod 36 to follow the way illustrated by the arrow 37.

Figure 13A:
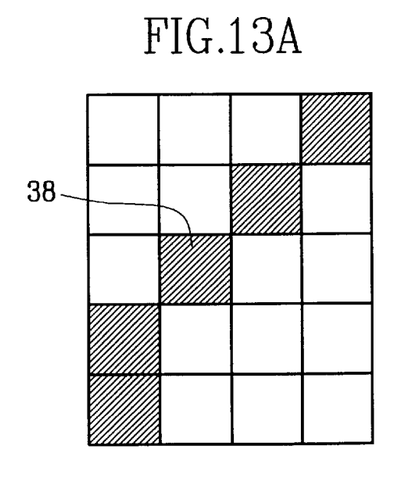
FIGS. 13A and 13B illustrate how an image to be displayed is built up.

The planar resistors described in the different embodiments above are square-shaped. The image shown on the display is therefor build up of a number of square-shaped areas as illustrated in FIG. 13A.

One further aspect of the invention is that resolution can be improved.

Figure 13B:
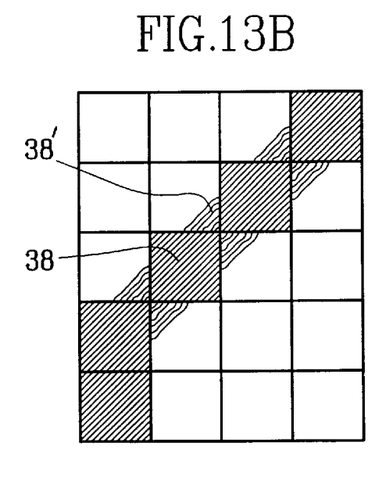

Resolution entrancement is achieved by filling certain pixels partly, as shown in FIG. 13B, in order to create less jagged diagonal lines 38. This works by heating the pixels that are needed to fill out the diagonals a little bit so that the temperature of these pixels are below the switching temperature but warmer than the cold pixel. The heat from the pixels which are below the switching temperature combined with the heat from the adjacent pixels which are heated fully to the transition temperature will heat parts of the pixels enough to cause them to pass their transition temperature and thus change the color of the pigment on the part of the area of the pixel. It is the parts 38' closest to the fully heated diagonals that will switch their optical properties as illustrated in FIG. 13B.

In certain environments it is suitable to use light sources to improve the visibility of the image to be shown on the display.

Figure 14:
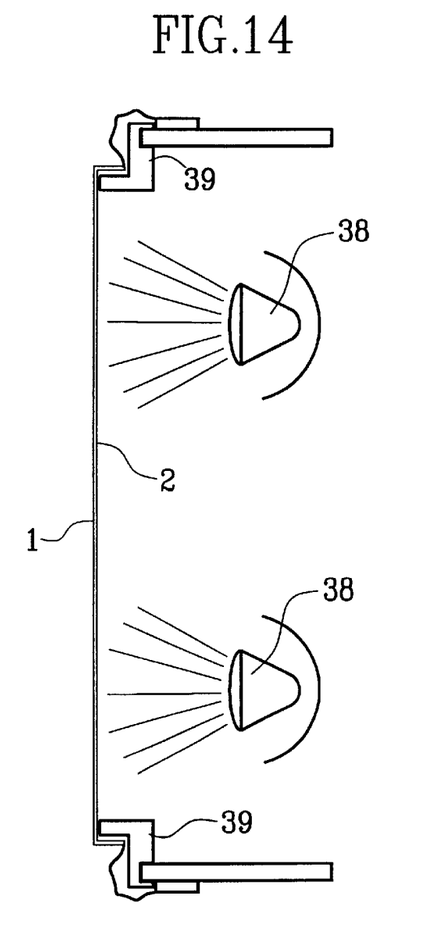
FIG. 14 shows schematically an embodiment of the display device in accordance with the invention and provided with light sources.

FIG. 14 shows schematically a display device according to the invention with light sources 38 behind the lamina of the thermosensitive layer 1 and the flexible film 2 with the planar resistors.

The lamina is supported by L-shaped profiles 39. Printed circuit cards 40 with driver electronic are arranged outside the display surface as shown in FIG. 14.

Figure 15:
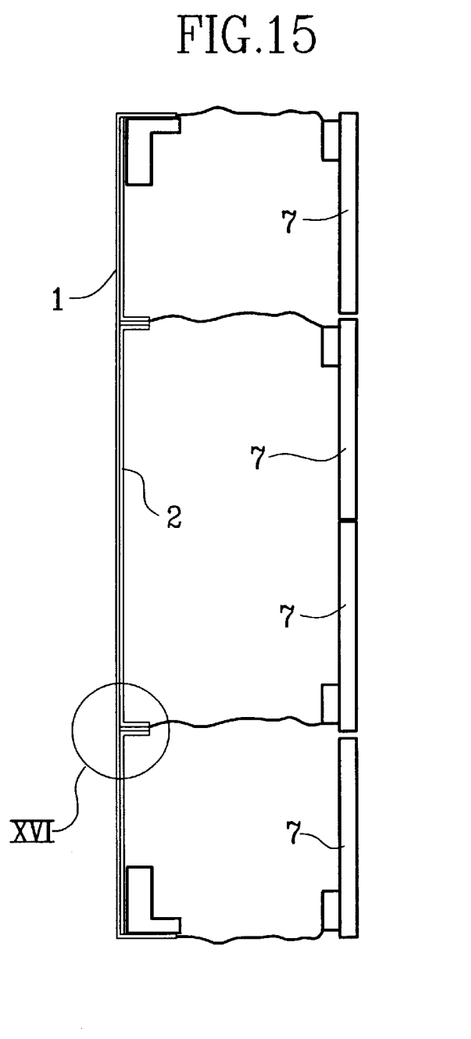
FIGS. 15 and 16 shows schematically an embodiment of the invention with a large display surface.
Figure 16:
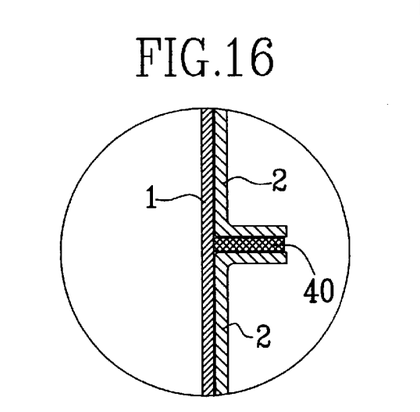

With reference to FIGS. 15 and 16 will be described an embodiment of the invention with a large display surface. Flexible films 2 with planar resistors are connected with adhesive 40 along marginal parts 2'. A thermosensitive layer 1 is applied as a smooth uninterupted layer as shown in FIG. 16. Printed circuit cards 7 are arranged behind the respective flexible film 2.

Although certain prefered embodiment have been shown and described it should be understood that changes and modifications can be made without departing from the scope of the appended claims.

The construction and configuration of the tiny planar resistors can be different than has been described above.

Varistors can be used to make the tiny heat elements.

The resistors can also be made of a conductive polymer.

The thermosensitive layer can as mentioned above be a reversible thermochromic material.

Also bistable thermochromic material can be used. The optical apperance in a bistable thermochromic material changes from a first state to a second state when the temperature increases from a first transition temperature to a second transition temperature and vice versa.

What is claimed is:

1. An electrically controlled device in a display, which through heat generated in a selected pattern displays information, said device comprising:
   a thermosensitive material applied in a thin layer, which thermosensitive material changes its optical appearance from a first state to at least a second state depending on its temperature;
   a thin flexible film;
   an array of resistors arranged on said thin flexible film in columns and rows with each column comprising one resistor from each row and each row comprising one resistor from each column, each one of said resistors having a thin planar configuration and extending in the plane of said flexible film and covering a substantially square-shaped area defined by the overlapping parts of a row and a column, said resistors being arranged to emit heat energy over said substantially square-shaped area when supplied with electrical current, said thin layer of thermosensitive material being applied directly in thermal contact with the thin flexible film and covering said rows and columns; and
   means for controlling the temperature in each of said areas by measuring characteristics of at least one resistor and controlling said electrical current.

2. A device according to claim 1, wherein the thermosensitive layer comprises a reversible thermochromic material.

3. A device according to claim 2, wherein said thermochromic material is applied in a thin layer on a plastic film, which is fastened to said flexible film carrying the resistors.

4. A device according to claim 3, wherein said two films with the resistors and the thermochromic material are removably fastened to a support means.

5. A device according to claim 3, wherein the plastic film with the thermochromic material is removably fastened to said flexible film.

6. A device according to claim 1, wherein each resistor comprises at least one very thin conductor arranged over the substantially square-shaped area whereby the dimensions of the conductor determines the resistance.

7. A device according to claim 6, wherein one conductor is arranged in a spiral like form in one plane, said spiral having the two ends of the conductor at its outer edge, from which two parallel conductor parts start and run in circular-like paths, which for each turn is reduced in size.

8. A device according to claim 7, wherein the distance between said parallel conductor parts and between adjacent turns in the spiral increase in a direction towards the center of the spiral in order to balance the flow of heat over the substantially square-shaped area and thereby achieve the same temperature over said area.

9. A device according to claim 6, wherein one conductor runs from one side of the square-shaped area to an opposite side in a number of zigzag paths.

10. A device according to claim 9, wherein the conductor parts in said zigzag paths are parallel and that temperature variations over said area due to the flow of heat over said area are reduced by having wider conductor parts in central parts compared to the borders, the conductor parts around a central point are widest and the width of the conductor parts decreases stepwise towards the borders, said central point is displaced towards the border of the substantially square-shaped area which in use of the device is the upper border, whereby said displacement compensates for that heat is transported upwards by ambient air.

11. A device according to claim 6, wherein the thin conductor is formed by etching a thin layer of a metal or an alloy applied on the flexible film.

12. A device according to claim 1, wherein all resistors are arranged close together on one side of said flexible film and conductors for supplying current to the resistors are arranged on an opposite side of the flexible film.

13. An electrically controlled display device for generating heat in a selected pattern in order to display information wherein said device in a modular system includes one or several interconnected modules, which modules comprise a thermosensitive material applied in a thin layer, which material changes its optical appearance from a first state to at least a second state depending upon its temperature, an array of resistors arranged on a thin flexible film in columns and rows with each column comprising one resistor from each row and each row comprising one resistor from each column, each one of said resistors having a planar configuration and extending in the plane of said flexible film and covering a substantially square-shaped area, said substantially square-shaped area defined by overlapping parts of a row and a column, said resistors being arranged to emit heat energy over said substantially square-shaped area when supplied with electricity, said thin layer of thermosensitive material being applied directly in thermal contact with the thin flexible film and covering said rows and columns, said modules further comprising means for controlling the temperature in each of said areas.

14. A device according to claim 13, wherein in each module said means for controlling the temperature comprises a microprocessor and drive circuits for the resistors, and wherein said device further comprises an interface for communication between microprocessors in said modules.

15. A device according to claim 14 wherein each resistor comprises a very thin conductor arranged over the substantially square-shaped area and wherein the resistors are made of a material which resistance changes due to the temperature and wherein means are connected to each resistor to measure its resistance variation and wherein means are arranged to feed back variations in the resistance of the resistors to the microprocessor, which due to the feed back controls the energy supply to each individual resistor in order to maintain or change the optical appearance of the respective display area in accordance with the information to be shown on the display.

16. A device according to claim 13, comprising means for supporting the thin flexible layer and the thermosensitive layer.

17. A device according to claim 16, wherein both the array of resistors and the drive circuits are applied on said flexible film, and wherein said film is folded around support means.

18. A device according to claim 17, wherein the array of resistors and drive circuits on said flexible film are formed by etching a thin layer of a metal, such as copper.

19. A device according to claim 17, wherein the array of resistors are formed by etching a thin layer of an alloy, such as stainless steel, applied on the film.

20. A device according to claim 16, wherein the flexible film is arranged surrounding the support means, with the array of resistors and the layer of thermosensitive material arranged on one side and forming a display surface, and wherein the driver circuits are arranged on a printed circuit board applied on the opposite side under the display surface.

21. A device according to claim 20, wherein the array of resistors is formed by etching a thin layer of a metal or an alloy applied on the flexible film, and the drive circuits are formed by etching a thin layer of a metal or an alloy arranged on the printed circuit board.

22. A device according to claim 16, wherein said two films are removably fastened to the support means.

23. A device according to claim 13, wherein the material in the resistors is a metal, such as copper.

24. A device according to claim 13, wherein the material in the resistors is an alloy, such as stainless steel.

25. A device according to claim 13, wherein the material in the resistors is a conductive polymer.

26. A device according to claim 13, wherein the resistors are formed of carbon paste, arranged on the flexible film by screen painting.

27. A device according to claim 13, wherein the flexible film is an inelastic film such as polyamide or polyester.

28. A device according to claim 13, wherein the thermosensitive layer comprises a reversible thermochromic material applied in a thin layer on a plastic film which is fastened to said flexible film.

29. A device according to claim 28, wherein the plastic film with the thermochromic material is removably fastened to said flexible film.

30. An electrically controlled display device for generating heat in a selected pattern in order to display information, said device comprising:
    a thin flexible film;
    an array of resistors arranged on said thin flexible film in columns and rows, with each column comprising one resistor from each row, and with each row comprising one resistor from each column, each resistor having a thin planar configuration and extending in the plane of the flexible film and substantially covering a respective square-shaped area defined by overlapping portions of one of said rows and one of said columns, each resistor arranged to emit heat energy over said respective square-shaped area when supplied with electrical energy, each resistor comprising at least one very thin conduit arranged in a spiral-like form in a plane over the square-shaped area, whereby the dimensions of the conduit determine a resistance of the resistor, wherein each conduit has two ends of the conduit at its outer edge, from which two parallel conduit parts start and run in circular-like paths, which for each turn is reduced in size;
    a thermosensitive material applied in a thin layer in thermal contact with said thin flexible film and covering said rows and columns, said thermosensitive material changing its optical appearance from a first state to at least a second state depending upon its temperature; and
    means for controlling the temperature in each of said areas.

31. A device according to claim 30, wherein the distance between the parallel conduit parts and between adjacent turns in the spiral increase in direction towards the center of the spiral in order to balance the flow of heat over the square-shaped area to thereby achieve the same temperature over the area.

32. An electrically controlled display device for generating heat in a selected pattern in order to display information, said device comprising:
    a thin flexible film;
    an array of resistors arranged on said thin flexible film in columns and rows, with each column comprising one resistor from each row, and with each row comprising one resistor from each column, each resistor having a thin planar configuration and extending in the plane of the flexible film and substantially covering a respective square-shaped area defined by overlapping portions of one of said rows and one of said columns, each resistor arranged to emit heat energy over said respective square-shaped area when supplied with electrical energy, each resistor comprising at least one very thin conduit arranged over the square-shaped area whereby the dimensions of the conduit determine a resistance of the resistor, wherein:
        one conduit runs from a first side of the square-shaped area to an opposite side on a number of parallel zigzag paths;
        temperature variations over said square-shaped area due to the flow of heat over the area are reduced by having wider conduit parts in a central portion of said compared to border portions of said area;
        the conduit parts around a central point are widest and the width of the conduit parts decreases stepwise towards the border portions; and
        the central point is displaced towards an upper border of the square-shaped area, whereby the displacement compensates for heat which is transported upwards by ambient air;
    a thermosensitive material applied in a thin layer in thermal contact with said thin flexible film and covering said rows and columns, said thermosensitive material changing its optical appearance from a first state to at least a second state depending upon its temperature; and
    means for controlling the temperature in each of said areas.

33. A method of enhancing the resolution of a display that displays information through heat generated in a selected pattern, the display comprising a thermosensitive material applied in a thin layer, which thermosensitive material changes its optical appearance from a first state to at least a second state depending on its temperature, an array of resistors arranged on a thin flexible film, each resistor having a thin planar configuration and extending in the plane of said flexible film and covering a substantially square-shaped area, said array of resistors being arranged to emit heat energy over said square-shaped area when fed with electrical current, and means for controlling the temperature in each of said areas by measuring characteristics of at least each resistor and controlling the electrical current, the method comprising heating pixels necessary to remove the jagged edges that are created when making a diagonal line from substantially square shaped pixels, said jagged edges being removed by partially heating the pixels in between the jagged edges, said pixels heated to a temperature above ambient temperature and below a switching temperature of a pigment of the thermosensitive layer in such a way that the heat energy in said pixel combined with the heat energy from a neighboring pixel is sufficient to change the color of the pigment in part of a pixel in such a way that the jagged edges are minimized or eliminated.

34. The method of claim 33, wherein a combination of heat energy created by the neighboring pixel and energy applied to said pixel enables the pixel to change color.

35. An arrangement in a display that displays information through heat generated in a selected pattern, the display comprising a thermosensitive material applied in a thin layer, which thermosensitive material changes its optical appearance from a first state to at least a second state depending on its temperature, an array of resistors arranged on a thin flexible film, each resistor having a thin planar configuration and extending in the plane of said flexible film and covering a substantially square-shaped area, said array of resistors being arranged to emit heat energy over said substantially square-shaped area when fed with electrical current, and means for controlling the temperature in each of said areas by measuring characteristics of at least each resistor and controlling the electrical current, the arrangement including a copper layer placed over the resistors of the substantially square shaped area to distribute the heat evenly within different sections of the thermosensitive layer thus creating smooth diagonal lines without the use of additional electronics.

* * * * *